(12) United States Patent
Feldpausch et al.

(10) Patent No.: US 8,180,538 B2
(45) Date of Patent: May 15, 2012

(54) ADAPTING STROKE PRESSURE OF A TRANSMISSION CONTROL ELEMENT

(75) Inventors: Terry G. Feldpausch, Carleton, MI (US); Karl M. Jungbluth, Commerce, MI (US); Christopher M. Williams, Farmington Hills, MI (US); Todd J. Newman, Ann Arbor, MI (US); Henry A. Rebandt, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 824 days.

(21) Appl. No.: 12/277,356

(22) Filed: Nov. 25, 2008

(65) Prior Publication Data

US 2010/0131161 A1    May 27, 2010

(51) Int. Cl.
*G06F 17/00* (2006.01)
*F16H 61/00* (2006.01)
(52) U.S. Cl. .......................................... 701/57; 477/117

(58) Field of Classification Search .................... 701/51, 701/55, 67, 73, 75, 83, 87, 95, 54, 58, 64, 701/53, 57, 59, 68; 477/34, 39, 40, 45–48, 477/50, 77, 132, 135, 139, 144, 158, 166, 477/117, 154, 155, 150, 156, 174, 120, 169, 477/61, 65, 78, 138; 475/31, 63, 70, 269; 180/408, 410; 303/146, 148
See application file for complete search history.

(56) References Cited

U.S. PATENT DOCUMENTS

| | | | |
|---|---|---|---|
| 5,106,352 A | 4/1992 | Lepelletier | |
| 5,577,980 A * | 11/1996 | Vukovich et al. | 477/144 |
| 5,951,615 A * | 9/1999 | Malson | 701/57 |
| 7,451,034 B2 | 11/2008 | Deur et al. | |

* cited by examiner

*Primary Examiner* — James Trammell
*Assistant Examiner* — Muhammad Shafi
(74) *Attorney, Agent, or Firm* — David B. Kelly, Esq.; MacMillan, Sobanski & Todd, LLC

(57) ABSTRACT

A method for controlling a transmission includes applying a reference stroke pressure to an oncoming control element while executing a downshift to a target gear, determining a stroke pressure adjustment in response to a turbine speed flare during the downshift, and re-executing the downshift while applying to the oncoming element an adapted stroke pressure that is a sum of the stroke pressure adjustment and the reference stroke pressure.

17 Claims, 4 Drawing Sheets

| CONTROL ELEMENT | R | 1 | 2 | 3 | 4 | 5 | 6 |
|---|---|---|---|---|---|---|---|
| 36 |  | X | X | X | X |  |  |
| 38 | X |  |  | X |  | X |  |
| 46 |  |  |  |  | X | X | X |
| 62 | X | X |  |  |  |  |  |
| 64 |  |  | X |  |  |  | X |

ADAPTING STROKE PRESSURE OF A TRANSMISSION CONTROL ELEMENT

BACKGROUND OF THE INVENTION

1. Field of the Invention

This invention relates generally to automatic transmissions for automotive vehicles, in particular to gear ratio changes produced in such transmissions by control elements such as friction clutches and brakes.

2. Description of the Prior Art

It is difficult to calibrate excellent shift quality under all circumstances for coasting or power-off downshifts in synchronous automatic transmissions. Such calibrations are especially difficult under low-speed conditions where vehicle noise levels are low and gear ratio steps are largest. Coasting downshifts present the largest inhibitor to a fully synchronous automatic transmission design.

Control strategies require calibration flexibility to ensure consistent, smooth downshifts under all operating conditions, but conventional gear shift control strategies are insufficient to meet the current requirements for coasting shift quality and cost.

Incorrect clutch stroke pressure can result in shifts that tie-up or have excessive flare. Such shifts are very noticeable to the vehicle operator. Shifts that repeatedly tie-up or flare can also result in damage to the control elements.

Conventional stroke pressure adaptation methods rely on analyzing the behavior of the clutch controlling the ratio change of an automatic transmission. They adjust the stroke pressure based on the amount of time it takes to reach a predetermined percent of shift completion. Such methods work in most cases for the measured events, but they sometimes lead to incorrect adaptation when other events use the same information.

A need exists in the industry for a technique that evaluates a shift event, and adapts pressure applied to the non-controlling element, which previously had no evaluation for stroke pressure and could therefore not adapt out of a bad shift.

SUMMARY OF THE INVENTION

A method for controlling a transmission includes applying a reference stroke pressure to an oncoming control element while executing a downshift to a target gear, determining a stroke pressure adjustment in response to a turbine speed flare during the downshift, and re-executing the downshift while applying to the oncoming element an adapted stroke pressure that is a sum of the stroke pressure adjustment and the reference stroke pressure.

The method may further include determining a maximum delta between a maximum and a minimum rate of change of a speed of an output of the transmission, if the delta is greater than a reference delta, determining a stroke pressure adjustment in response to the delta, and re-executing the downshift while applying to the oncoming element an adapted stroke pressure that is a sum of the second stroke pressure adjustment and the reference stroke pressure.

This flare based algorithm is robust since it operates under near steady state, light torque, closed pedal conditions and is based on the quantity of flare that occurs. The algorithm evaluates the shift event to adapt the non-controlling element.

The control measures the flare and then accordingly adjusts the stroke pressure on the oncoming clutch to prevent any future shift quality degradation due to the flare. The control also prevents any over-learning of stroke pressure, which can lead to a tie-up and shift quality degradation.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figures 1, 2:
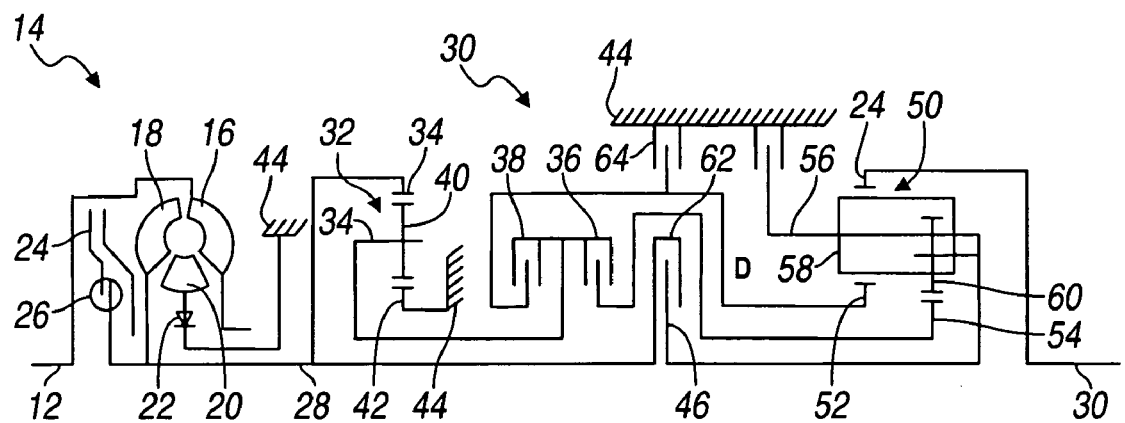
FIG. 1 is a schematic diagram showing the kinematic arrangement of an automatic transmission.
FIG. 2 is a table showing the engaged and disengaged state of friction elements that control the transmission of FIG. 1.

Referring now to the drawings, there is illustrated in FIG. 1 an engine crankshaft 12 secured to a hydraulic torque converter 14, which includes a bladed impeller 16, a bladed turbine 18, a stator 20, an overrunning or one-way clutch 22, a lock-up clutch 24, and a torsional vibration damper 26. Hydraulic fluid exiting the impeller 16 hydrokinetically drives turbine 18 when clutch 24 is open. The engine shaft 12 drives turbine 18 directly when clutch 24 is engaged. The turbine 18 drives the input shaft 28 of an automatic transmission 30, whose input shaft 28 and output shaft 30 are aligned.

A simple planetary gearset 32 includes a ring gear 34 secured to the input shaft 28, a planet carrier 34 connected to a first control clutch 36 and to a second control clutch 38, planet pinions 40, and a sun gear 42, fixed relative to the casing 44. The input shaft 28 directly drives a third control clutch 46.

A double planetary gearset 50, of the Ravigneaux type, includes sun gears 52, 54, planet carrier 56, planet pinions 58 supported on carrier 56 and meshing with planet pinions 60 and with sun gear 54. The ring gear 24 meshes with planet pinions 58.

Friction brake 62 secures carrier 56 against rotation on casing 44 and releases that connection alternately. Friction brake 64 secures sun gear 52 and clutch 38 against rotation on casing 44 and releases that connection alternately.

FIG. 2 shows a table of the engaged and disengaged states of the friction control elements 36, 38, 46, 62, 64 that control operation of the transmission 30 in seven modes, six forward speeds and reverse drive. The seven modes correspond to seven combinations of pairs of the three clutches 36, 38, 46 and two brakes 62, 64. The change from each combination to the next, or to the one thereafter, is achieved throughout the whole range by changing only one of the two friction elements engaged, i.e. exclusively by single transition shifts.

As illustrated in FIG. 2, the second forward gear is produced when clutch 36 and brake 64 are engaged. A downshift to first gear is produce by maintaining clutch 36 engaged, disengaging brake 64 and engaging brake 62. When a 2-1 downshift is executed, the off-going control element is brake 64 and the oncoming control element is brake 62. When a 3-2 downshift is executed, the off-going control element is clutch 38 and the oncoming control element is brake 64.

Figure 3:
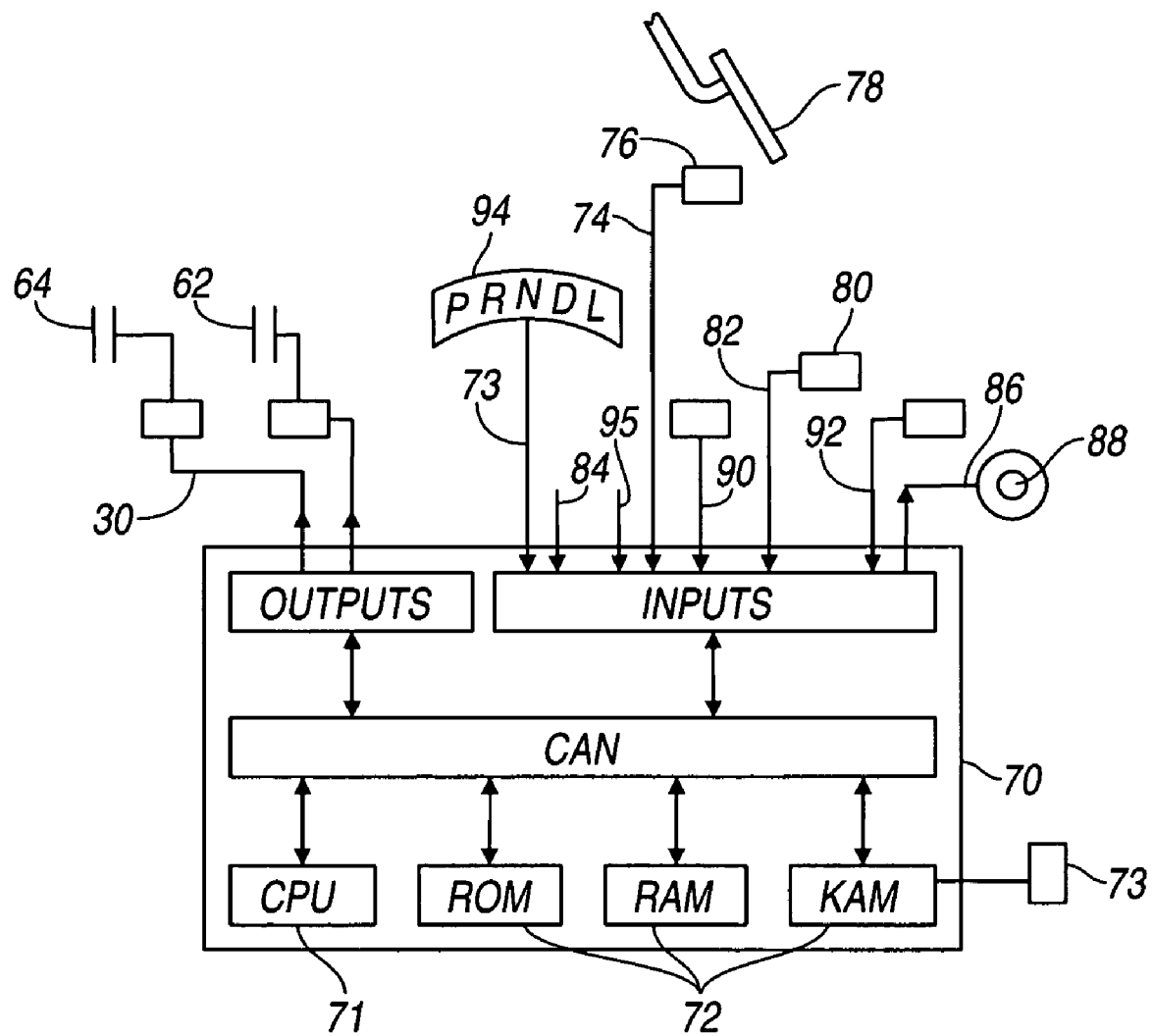
FIG. 3 is system to which the control strategy can be applied.

Referring now to FIG. 3, an electronic controller 70 includes a central processing unit CPU 71, which communicates with various input signals, and electronic memory 72 containing control algorithms stored there in coded form readable by the CPU. The memory for each control element, i.e., clutches 36, 38, 46 and brakes 62, 64, contains a base stroke pressure 108. A KAM cell 73 for each control element is updated with a stroke pressure adjustment in response to the result of a previous shift, as described below with reference to FIG. 5. The contents of KAM cell 73 is added to the reference or base stroke pressure of the control element for the respective shift to produce an adapted stroke pressure that is used in each shift following the shift in which the most recent stroke pressure adjustment is determined.

The input signals include a signal 74 produced by accelerator pedal sensor 76, which produces a signal representing the desired wheel torque in response to the vehicle operator's manual control of the accelerator pedal 78. A sensor 80 produces a signal 82 representing the magnitude of torque produced by turbine 18 and transmitted by input shaft 28. Input signal 84 represents the vehicle speed. Input signal 86 represents the engine throttle position, i.e., the extent to which the engine throttle 88 is open. Input signal 90 represents the transmission oil temperature TOT. Input signal 92 represents the engine coolant temperature. Input signal 73 represents the position of the PRNDL 94. Input signal 95 represents the speed of output shaft 30.

Controller 70 produces and sends output signals to solenoids, which control the magnitude of hydraulic pressure, which alternately applies, releases and strokes brakes 62, 62, respectively. Clutches 36, 38, 46 are similarly actuated by controller 70 in response to shift control algorithms stored in electronic memory 72.

Any speed flare or tie-up across the turbine 18 is very strongly dependent on the stroke pressure of the on-coming control element. Stroke pressure is the pressure of hydraulic fluid in the oncoming control element that is sufficient to fill the servo cylinder that actuates the control element, to overcome the force of the servo return spring, and to take up clearances in the servo and control element, but is insufficient to transmit torque through the oncoming control element.

Although the adaptive control of a 2-1 downshift is described here, the control is applicable to any downshift having nearly steady state conditions and a closed or released accelerator pedal 78, preferably with the speed of the turbine 18 being less than the engine speed.

Figure 4:
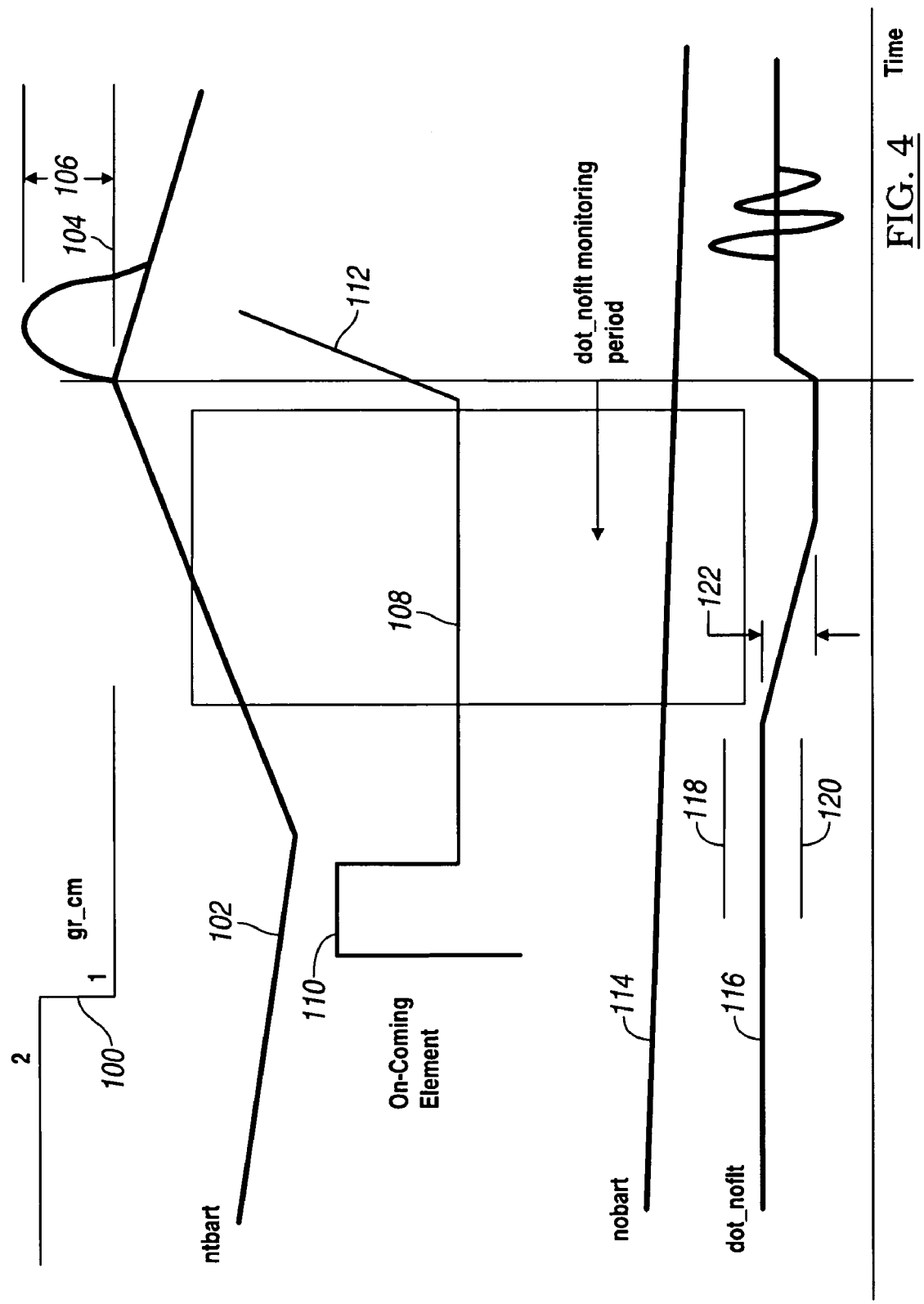
FIG. 4 is a series of graphs showing the change of several variables during a downshift in which stroke pressure adjustment is being determined.

In FIG. 4 at 100, controller 70 issues a command to execute a 2-1 downshift from the current gear to a target gear. The filtered turbine speed (NTBART) 102 after initially decreasing increases toward the synchronous speed of the target gear, i.e., first gear. Synchronous speed is the speed that the input shaft 28 and turbine 18 would have at the current vehicle speed with the transmission operating in the target gear.

The speed of input 28 and turbine 18 is seen to flare above or overshoot 106 the synchronous speed 104 because the base or reference stroke pressure 108 of the oncoming element (brake 62) was too low. If the speed of input 28 and turbine 18 were less than the synchronous speed 104, the transmission becomes susceptible to a tie-up.

Controller 70 initially boosts pressure in brake 62 to 110, after which that pressure decreases to the reference or base stroke pressure 108 and thereafter increases along a ramp 112 to a pressure at which brake 62 is closed and transmits torque.

The filtered speed of output 20 (NOBART 114) decreases during the downshift. During the downshift, controller 70 repetitively monitors NOBART 114 and the rate of change 116 (dot_noflt) of NOBART 114. Controller 70 determines repetitively the maximum 118 and minimum 120 rate of change 116 of NOBART 114 and the maximum difference or delta 122 between the maximum 118 and minimum 120 rate of change 116 of NOBART 114 during the downshift.

Figure 5:
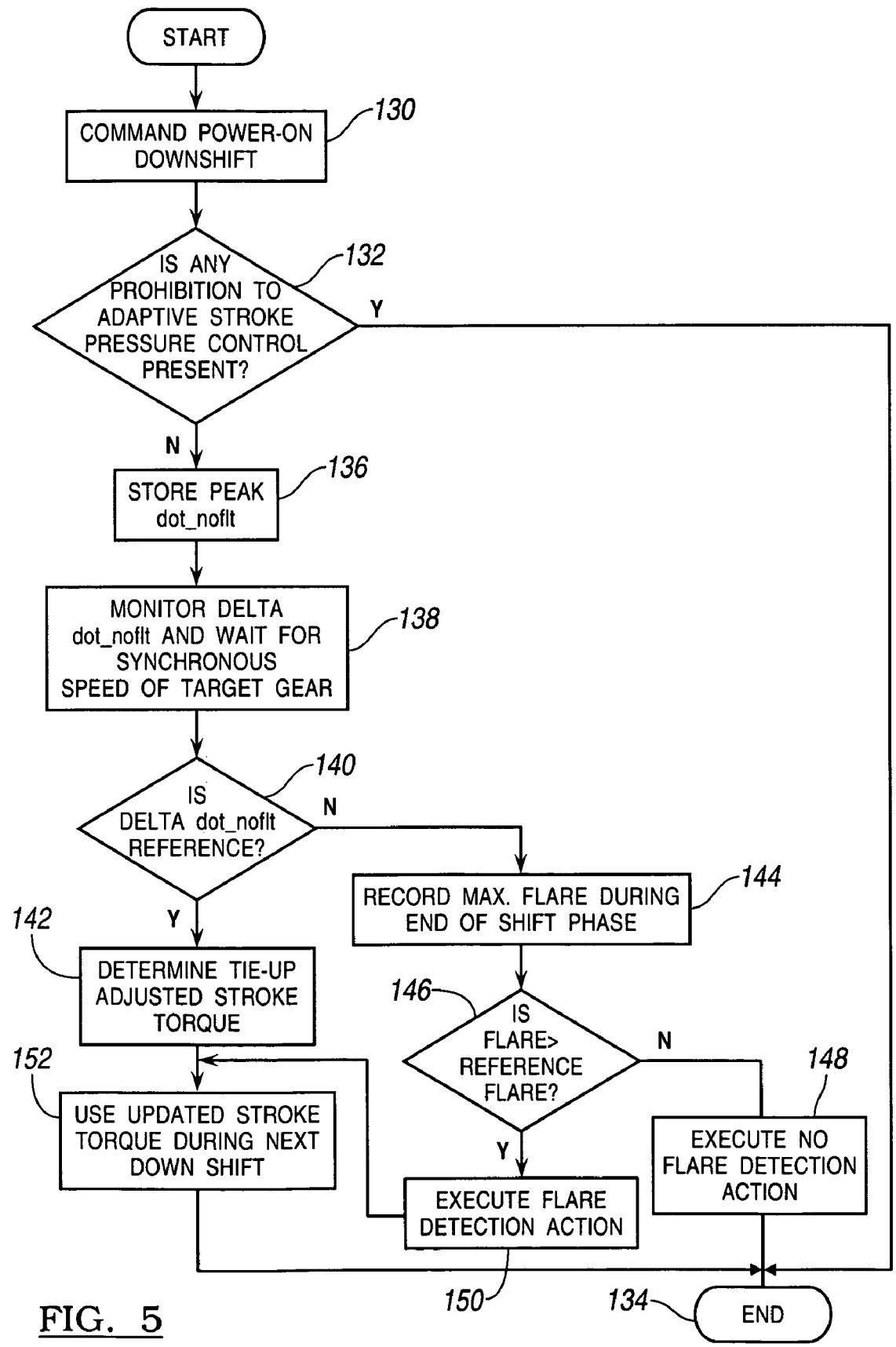
FIG. 5 is logic flow diagram of an algorithm in which the magnitude of control element stroke pressure is updated for later gear changes.

Referring now to the algorithm of FIG. 5, at step 130 controller 70 commands a power-on, low torque downshift, such as a 2-1 or 3-2 downshift. Before step 130 is performed the oncoming control element 62 must be calibrated to use the slip adapt function; the transmission temperature 90 must be between upper and lower reference limits; engine coolant temperature 92 must be between upper and lower reference limits; the powertrain must be producing positive drive, i.e., torque is transmitted from the engine to the vehicle wheels; and a code indicating the current downshift must be established. If each of these criteria is satisfied, step 130 is executed.

At step 132 a test is made to determine whether any prohibition to executing the adapt stroke pressure control algorithm is present. The prohibitions include: pedal position 74 greater than a maximum reference position, a rate of change of pedal position 74 above a maximum reference rate of change, the speed 95 of output shaft 30 greater than a maximum reference speed or less than a minimum reference speed, the rate of change of the speed of output shaft 30 greater than a maximum reference rate of change, turbine torque greater than a maximum torque or less than an minimum reference torque, a rate of change of turbine torque above a maximum reference rate of change, and the PRNDL 94 not in the DRIVE position. If the result of test 132 is logically positive, the control is exited at step 134.

If the result of test 132 is negative, control advances to step 136 where controller 70 stores the maximum 118 and minimum 120 of the derivatives of output shaft speed 114 that occur after command 100 and before turbine speed 102 reaches the synchronous speed 104.

At step 138, controller 70 waits for turbine speed 102 to reach the synchronous speed 104 of the target gear and determines the difference between the maximum 118 and minimum 120 of the derivatives of output shaft speed 114.

At step 140, controller 70 performs a test to determine whether the delta or difference 122 between in the maximum 118 and minimum 120 derivatives of output shaft speed 114 is greater than a calibratable reference delta value.

If the result of test 140 is positive, at step 142 controller 70 either decreases or does not change the stroke pressure adjustment in KAM cell 73 because a tie-up has been indicated. When the subject downshift is executed subsequently, at step 152 controller 70 retrieves the stroke pressure adjustment from KAM cell 73 using the indexing parameters: oncoming control element 62 and the subject downshift. Controller 70 then controls an adapted stroke pressure for the subject downshift by adding the stroke pressure adjustment to the reference or base stroke pressure 108 and applies the adapted stroke pressure to the oncoming control element 62 instead of the reference stroke pressure 108 during the subsequent downshift.

If the result of test 140 is negative, at step 144 controller 70 records in memory 72 the maximum flare 106 of turbine speed above the synchronous speed 104 that occurs during the end of the shift phase.

At step 146 a test is made to determine whether the flare 106 is greater than a calibratable reference flare. Test 146 is performed to avoid inaccuracies resulting from noise in the acquired data.

If the result of test 146 is negative, control advances to step 148, where no change in the stroke pressure adjustment contained in the KAM cell 73 of the oncoming control element 62 is made.

If the result of test 146 is positive, a sufficiently large flare has occurred to update the stroke pressure of the oncoming element 62. At step 150, a calibratable stroke pressure adjustment commensurate with the magnitude of flare 106 is placed in the KAM cell 73 of the oncoming control element 62 for the subject downshift.

When the subject downshift is executed subsequently, at step 152 controller 70 retrieves the stroke pressure adjustment from KAM cell 73 using the indexing parameters: oncoming control element 62 and the subject 2-1 downshift. Controller 70 produces an adapted stroke pressure for the downshift by adding the stroke pressure adjustment to the reference or base stroke pressure and applies the adjusted stroke pressure to the oncoming control element 62 instead of the reference stroke pressure 108 during the subsequent downshift.

The algorithm learns the correct stroke pressure based on analysis of prior shift events. Flare is used as a basis to detect an under-stroke pressure condition and to increase stroke pressure. Tie-up detection is used to detect an over-stroke pressure condition and to decrease, or not increase stroke pressure.

In accordance with the provisions of the patent statutes, the preferred embodiment has been described. However, it should be noted that the alternate embodiments can be practiced otherwise than as specifically illustrated and described.

The invention claimed is:

1. A transmission control method wherein a controller performs the steps comprising:
    applying a reference a stroke pressure to an oncoming element while executing a downshift;
    decreasing stroke pressure for a second downshift if a delta between a maximum and minimum rate of change of transmission output speed is greater than a reference delta during the downshift;
    when said delta is less than the reference delta, using a magnitude of turbine speed flair to adjust stroke pressure for the second downshift.

2. The method of claim 1 further comprising:
    after applying the reference stroke pressure, increasing pressure in the oncoming element greater than the reference stroke pressure;
    determining the stroke pressure adjustment from data produced while pressure in the oncoming element is greater than the reference stroke pressure.

3. The method of claim 1 further comprising:
    increasing the turbine speed toward a synchronous speed for a target gear.

4. The method of claim 1 wherein the stroke pressure adjustment varies with a magnitude of a difference between the flare and a reference flare.

5. The method of claim 1 wherein the delta is determined from data produced during the downshift before the turbine speed reaches a synchronous speed for the target gear.

6. The method of claim 1 wherein the decrease in stroke pressure for the second downshift varies with a magnitude of a difference between the delta and the reference delta.

7. The method of claim 1 wherein a change in stroke pressure for the second downshift may be zero.

8. A transmission control method wherein a controller performs the steps comprising:
    applying a reference stroke pressure to an oncoming control element while executing a downshift to a target gear;
    determining a delta between a maximum and a minimum rate of change of a speed of an output of the transmission;
    when the delta is greater than a reference delta, determining a stroke pressure adjustment in response to the delta;
    executing a second downshift while applying to the oncoming element an adapted stroke pressure that is a sum of the second stroke pressure adjustment and the reference stroke pressure.

9. The method of claim 8 wherein the delta is determined from data produced during the downshift before the turbine speed reaches a synchronous speed for the target gear.

10. The method of claim 8 wherein the stroke pressure adjustment varies with a magnitude of the delta.

11. The method of claim 8 wherein the stroke pressure adjustment may be zero.

12. The method of claim 8 further comprising:
    determining a second stroke pressure adjustment in response to a turbine speed flare during the downshift;
    when the delta is less than a reference delta, executing a second downshift while applying to the oncoming element an adapted stroke pressure that is a sum of the second stroke pressure adjustment and the reference stroke pressure.

13. The method of claim 12 further comprising:
    after applying the reference stroke pressure, increasing pressure in the oncoming element greater than the reference stroke pressure;
    determining the second stroke pressure adjustment from data produced while pressure in the oncoming element is greater than the reference stroke pressure.

14. The method of claim 12 further comprising:
    increasing the turbine speed toward a synchronous speed for the target gear.

15. The method of claim 12 wherein the second stroke pressure adjustment varies with a magnitude of the flare.

16. A system for controlling a transmission downshift comprising:
    a turbine;
    an oncoming control element;
    an output;
    a controller configured to apply a reference stroke pressure to the oncoming control element while executing a downshift to a target gear, to decrease stroke pressure for a second downshift if a delta between a maximum and minimum rate of change of transmission output speed is greater than a reference delta during the downshift, and if said delta is less than the reference delta, to use a magnitude of turbine speed flair to adjust stroke pressure for the second downshift.

17. The system of claim 16 wherein the controller is further configured to determine a maximum delta between a maximum and a minimum rate of change of a speed of the output; to determine a stroke pressure adjustment in response to the delta, if the delta is greater than a reference delta; and to execute the second downshift while applying to the oncoming element an adapted stroke pressure that is a sum of the second stroke pressure adjustment and the reference stroke pressure.

* * * * *